Nov. 15, 1949     D. LANDEN     2,487,814
MAPPING INSTRUMENT
Filed March 25, 1946     3 Sheets-Sheet 1
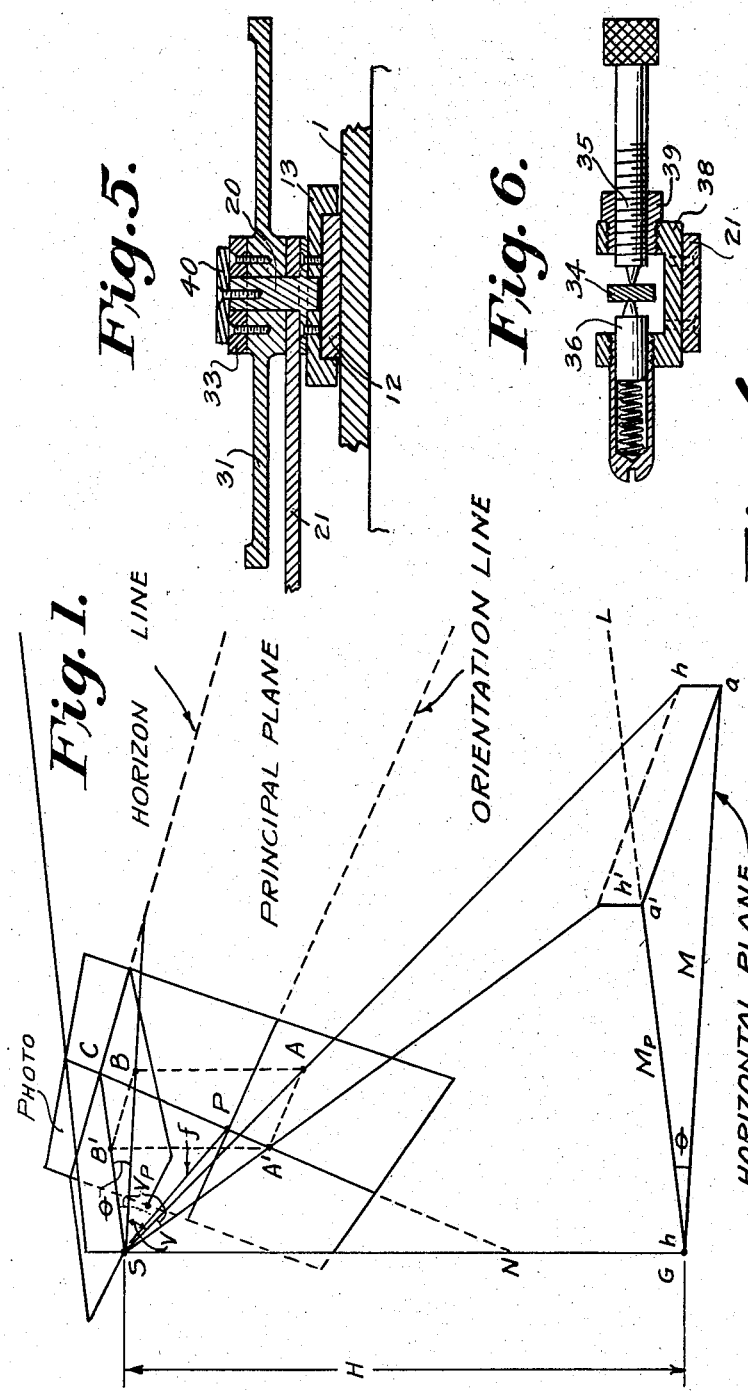
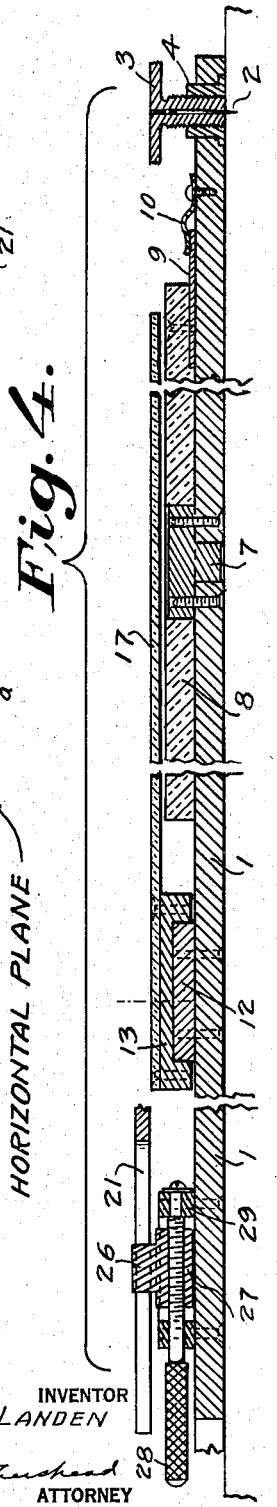
INVENTOR
DAVID LANDEN
BY
ATTORNEY

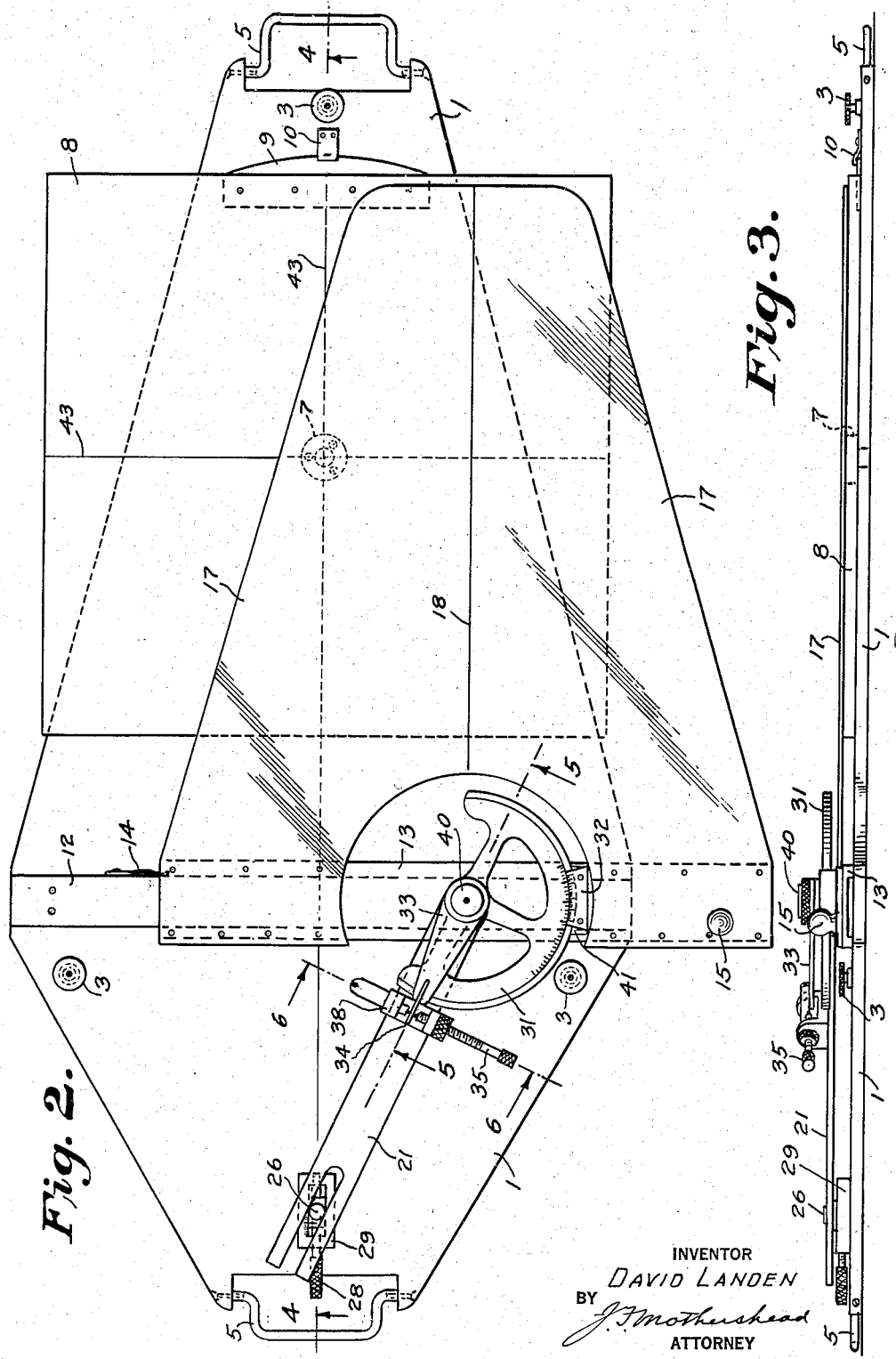

INVENTOR
DAVID LANDEN

Patented Nov. 15, 1949

2,487,814

UNITED STATES PATENT OFFICE 2,487,814

MAPPING INSTRUMENT

David Landen, Arlington, Va., assignor to the United States of America as represented by the Secretary of the Interior Application March 25, 1946, Serial No. 656,950

9 Claims. (Cl. 33—1)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the art of map-making, and more particularly to instruments for making maps from photographs.

Heretofore, in the making of topographic maps from oblique aerial photographs, it has been customary to determine horizontal and vertical angles analytically or mechanically with instruments operating in a three dimensional spatial model for determining elevations from the aerial photographs. Such prior practice required the use of a telescope for measuring vertical angles in determining the elevation of photograph images. This prior practice is explained in the article "Oblique photographs and the photoalidade," by R. M. Wilson, published in the April, May, June 1938 issue of Photogrammetric Engineering, and is also explained in his Patent No. 2,261,201, dated November 4, 1941.

The present invention provides instruments for making topographic maps from aerial photographs without necessitating the use of a telescope or lens system to measure vertical angles of the oblique or tilted photographs.

According to the present invention, the elevation of an image in an oblique photograph is computed from values in the photograph principal plane as distinguished from values in a three dimensional spatial model. For a further disclosure as to such principal plane computation and the present invention, reference is made to a paper published in the September 1945 issue of Photogrammetric Engineering, entitled "A principal plane photoalidade for oblique photographs," by David Landen.

The equipment provided by this invention has many applications. It may be used for reconnaissance mapping from oblique photographs. Another use is by geologists in the making of "on the spot" maps with oblique and horizontal photographs taken from ground stations. Still another use is in the making of tilt analyses of aerial photographs.

It is, therefore, an object of this invention to provide a relatively simple and inexpensive instrument for sighting oblique photograph images and projecting them into a two dimensional principal plane, where the projected value of the vertical angle may be measured.

A still further object is to provide a relatively simple and inexpensive instrument which is adapted to project the vertical angle of an oblique photograph into a two dimensional plane and measure the projected vertical angle and which is also adapted to measure true horizontal angles using horizontal photographs.

A further object is to provide a relatively simple, efficient and inexpensive mechanical means of tilt and swing adjustment in leveling and orienting an oblique photograph.

Another object of the invention is to provide an instrument enabling one to make maps from horizontal photographs using the methods of radial line intersection for position and vertical angle triangulation for elevations.

Another object of the invention is to provide a simple instrument for observing horizontal and vertical angles for phototopographic mapping with horizontal photographs taken from ground or air stations.

Still another object is to provide a relatively simple and inexpensive instrument for projecting the horizontal or ground distance of an oblique photograph image into a two dimensional principal plane, where the projected value of the horizontal distance may be measured.

Other objects and advantages of this invention will be apparent from the following description, the appended claims, and the accompanying drawings, wherein Fig. 1 is a graphic illustration of the principal plane method for determining elevations according to this invention.

Fig. 2 is a top plan view of a topo-angulator instrument embodying this invention.

Fig. 3 is a side elevation of the instrument of Fig. 2.

Fig. 4 is a vertical sectional view taken on line 4—4 of Fig. 2.

Fig. 5 is a detail sectional view taken on line 5—5 of Fig. 2.

Fig. 6 is a view in section taken along line 6—6 in Fig. 2.

Fig. 1.—A principal plane method

Figure 8:
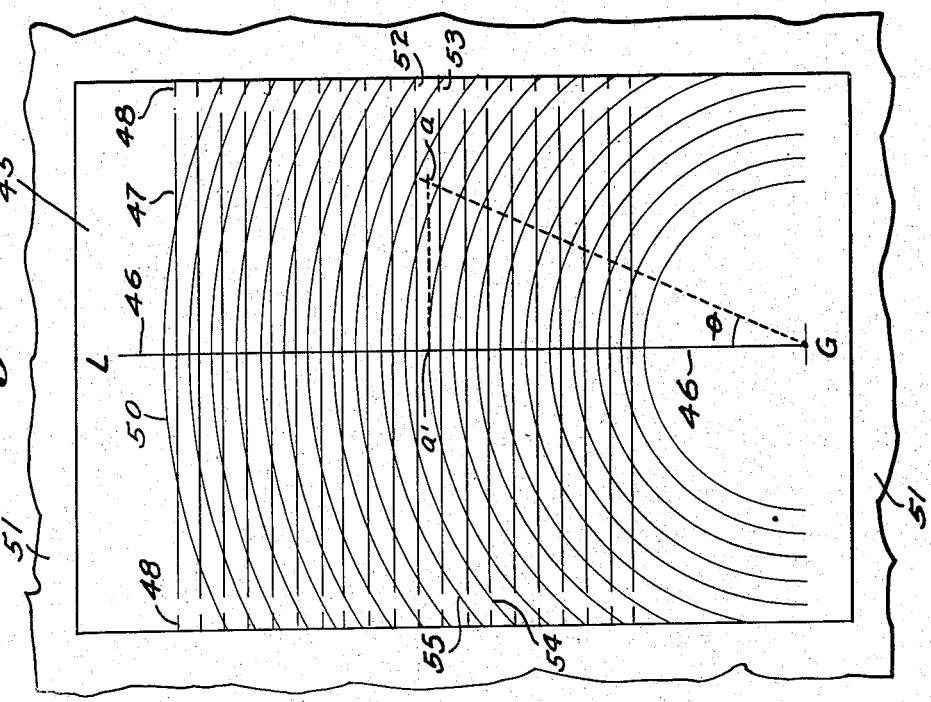
Fig. 8 is a plan view of the use of the instrument of Fig. 7 in its application to a map base.

Referring now to the drawings, Fig. 1 is a perspective illustration of a principal plane method used in this invention. Fig. 1 shows an aerial oblique photograph (marked "photo"), the internal perspective point or center S of the aerial camera (not shown), the camera focal length $f$, the principal point P of the photograph, and the photograph plumb point N.

In Fig. 1, the object being mapped is $a$, its elevation is $h$, and its true ground distance from the ground plumb point G is M. The image of the object $a$ is A, which is projected to point B in the horizontal plane containing the perspective center S and the true horizon.

Heretofore, the elevation $h$ of the object $a$ was secured by first determining the true ground distance M and the vertical angle BSA or V and then proceeding with the general solution:

$$H - h = M \tan V - KM^2 \qquad (1)$$

within H−$h$ is the difference of elevation of the aerial camera (not shown) and the object $a$, M is the true ground distance, V is the vertical angle (BSA), and $KM^2$ is the correction for earth curvature and refraction of light.

According to the present invention, which uses a Principal Plane method, the vertical angle V and the ground distance M are projected into the photograph principal plane SCPN, and their projected values are determined and used in solving the elevation of the object $a$. In Fig. 1, the angle V (BSA), when projected, is angle $V_P$ (B'SA') in the photograph principal plane SCPN. A is the projected position of the image A and B' is the projected position of the point B. Line GL is the trace of the principal plane upon the map (not shown).

When projected into the photograph principal plane, the object $a$ becomes $a'$, and the ground distance M becomes $M_P$. $h$ and $h'$ are equal elevation values.

The photograph principal plane is the vertical plane through the internal perspective point (S) containing the plate perpendicular ($f$) of an oblique photograph. In Fig. 1, the photograph principal plane includes the photograph plumb point N, and the principal point P.

In the principal plane method, the relation becomes $$H - h = M \tan V \frac{\cos \theta}{\cos \theta} - KM^2 \qquad (2)$$

Since $M_P = M \cos \theta$ and $$\tan V_P = \frac{\tan V}{\cos \theta}$$

then $\qquad H - h = M_P \tan V_P - KM^2 \qquad (3)$

The principal plane vertical angle $V_P$ is greater than the vertical angle V, and the principal plane distance $M_P$ is less than the true ground distance M. In Equation 3, the principal plane vertical angle $V_P$ is greater and the principal plane component $M_P$ of the ground distance is less by exactly the same ratio. Therefore, Equations 1 and 3 are equal, and the principal plane method provides a relatively simple procedure for securing elevations from oblique photographs in the making of topographic maps.

Topo-angulator

The instrument provided by this invention for use in projecting the vertical angle V into the photograph principal plane and measuring the principal plane vertical angle $V_P$ is illustrated in Figs. 2 through 6 and will now be described.

The instrument or topo-angulator for measuring the principal plane vertical angle $V_P$ has a flat base or plate 1 which in use may rest directly on a map base (not shown) and be fixed thereto in definite position as by needles 2 which may pierce the map base (not shown). Each needle 2 is secured in a locking knob 3 which is threaded into a bushing 4 that is set in and secured to the base 1.

The topo-angulator may be oriented relative to a map base and may also be carried in the hands by means of handles 5 pivotally connected at their ends to the base 1.

A stud 7 is secured to the base 1 and projects therefrom to serve as a pivot for a flat swing plate or photograph support 8. The swing plate 8 rests on the base 1 and is rotatably adjustable about the stud 7. In the use of the topo-angulator, the plate 8 is adjusted about the stud 7 to correct for photograph swing. This adjustment is facilitated by a vernier scale and index. The vernier scale may be applied to a member 9 set in the edge and lower face of the swing plate 8 and extending therefrom. The lower face of the member 9 is flush with the lower face of the plate 8 and rests on the base 1. The outer edge of the member 9 is arc shaped with the axis of the stud 7 as its center of curvature. A spring arm 10 is secured at one end to the base 1 and at its other end presses against the upper face of the vernier scale member 9 to serve as both an index member for the vernier scale and a spring clamp for retaining the swing plate 8 in adjusted position.

A flat strip 12 having parallel side edges is secured to the upper face of the base 1 and serves as a guide for a slide 13. The slide 13 is U-shaped in cross section to provide an under face longitudinal recess for receiving the guide 12. Spring arms 14, each secured at one end to an edge of the guide 12 act on the opposed inner recess side wall surface of the slide 13 to maintain the slide 13 and the guide 12 in predetermined relation during adjustment of the slide 13 and to hold the slide 13 in a selected position of adjustment. The slide 13 is adjustable longitudinally and rectilinearly and along the guide 12 and may be so adjusted by grasping a knob 15 secured to the slide 13.

An index or sighting plate 17 is secured to the upper face of the slide 13 for movement therewith and extends laterally thereof to overlie and rest on—for sliding engagement—a photograph (not shown) carried by the swing plate 8. The index plate 17 has a reference, sighting, or index line 18 for a purpose to be explained. In the illustrated and preferred embodiment of the invention, the index plate 17 is transparent and has engraved on the underside a hairline for use as the index line 18. The index line 18, however, may be formed as an edge of the index plate 17. The index line 18 is used for measuring longitudinal displacements in a photograph mounted upon the swing plate 8 and for determining the line AA' of Fig. 1.

A slide post 20 (see Fig. 5) is mounted upon and secured, as by means of screws, to the slide 13 and transfers longitudinal displacements of index plate 17 (displacements resulting from rectilinear, longitudinal movements of slide 13) to angular displacements of a lever arm 21. The lever arm 21 at one end is journaled to the post 20 for rotation about the axis thereof. The lever arm 21 at the other end is bifurcated or slotted to receive and engage a pivot pin 26, whereby the lever arm 21, during a shifting movement of the slide 13 and the slide post 20, may have a combined rotary and longitudinal sliding movement or pivotally sliding movement relative to the pivot pin 26. The post 20 provides a pivotal connection between one end of the arm 21 and the slide 13; and the pin 26 and the bifurcated end of the arm 21 provide a pivotally sliding connection between the arm 21 and the base 1.

The topo-angulator has a focal length adjustment so that the instrument in each use may be adjusted according to the focal length of the photograph resting on the swing plate 8. This adjustment is secured by moving the pin 26 along a line intersecting the axis of the pin 26 in any setting and the axis of the swing plate stud 7. This adjustment is provided by mounting the pivot pin 26 on a slide block 27 which is carried by an adjusting screw 28. This screw 28 is threaded in a focal adjusting block 29 mounted upon and secured to the base 1. The slide block 27 and the pivot pin 26 are adjusted by the adjusting screw 28 to engraved divisions (focal length settings) upon the focal adjusting block 29.

Angular displacements of the lever arm 21 about the axis of the slide post 20 are indicated by an arc 31 and a vernier 32. The arm 31 (see Fig. 5) is rotatably secured to the slide post 20 and is adjustably secured to the arm 21 for movement therewith. A tangent screw arm 33 (see Figs. 1 and 5) is secured, as by means of screws, to the arc 31 and has a lug 34 which is held in contact with a tangent screw 35 (see Figs. 1 and 6) by a conventional spring pressed plunger 36. The tangent screw 35 is threaded in a bushing 39 which is mounted in a lug 38. The plunger 36 together with its spring and support are also mounted on the lug 38. This lug 38 is mounted in fixed position upon arm 21.

A screw member 40 (see Fig. 5) is threaded into the post 20 to retain the post 20, the lever arm 21, and the arc 31 with its tangent screw arm 33 in assembled relation.

Initial settings of the arc 31 are made by the tangent screw 35 which rotatably adjusts the arc 31 about the axis of the slide post 20 and relative to the arm 21. This adjustment corrects for tilt of the photograph being used on the topo-angulator.

The vernier 32 is mounted upon a block 41 which rests upon and is secured to the slide 13.

Accuracy in results from the use of the topo-angulator are achieved by providing a definite relationship of planes and axes. The base 1, the swing plate 8, the photograph (not shown) thereon, and the index plate 17 should extend in parallel planes. These planes also should remain unchanged by adjustment of either the swing plate 8 or the index plate 17. The axes of the swing plate stud 7, the arc 31, the slide post 20, and the pivot pin 26 are axes of adjustments and movements and are perpendicular to the plane of the swing plate 8 and also to the plane of the base 1. Here, it is noted that the axis of the slide post 20 coincides with the axis of the arc 31 and the axis of movement for the arm 21 about the slide post 20.

When the index plate 17 is adjusted so that its index line 18 and the axis of the swing plate stud 7 intersect, the index line 18 is also aligned with the axes of the slide post 20 and the pivot pin 26. This is the tilt setting for the instrument. In this setting, the spacing of the axes of the post 20 and the pivot pin 26 should have such adjustment as to conform to the focal length for the photograph.

The axis of the slide post 20 corresponds in position to the projected image A' of Fig. 1; and the axis of the pivot pin 26 corresponds in position to the perspective center S of Fig. 1. Thus, if the arm 21 were set in its zero position, line SA' would occupy the position SB'. This is the zero setting or position of the arm 21, in which setting the arm 21 defines line SB' of Fig. 1.

In the shifting of the slide 13 along the guide 12, the axis of the slide post 20 travels along a line which is the mechanical equivalent of the photograph principal line (CPN of Fig. 1).

The mechanical equivalent of the photograph principal plane (SCPN of Fig. 1) is the plane including the instrument principal line and the instrument perspective center (axis of pin 26).

The axis of the swing plate stud 7 is the mechanical equivalent of the principal point P of Fig. 1.

The swing plate 8 is provided with two engraved lines 43 which intersect at the axis of the stud 7 and which are at right angles to each other. The photographs (not shown) to be used in the topo-angulator are provided with collimating or reference marks at their edges which enable the operator to orient properly each photograph on the swing plate 8. When the photograph collimating marks (not shown) register with the engraved lines 43, the photograph principal point registers with the axis of the swing plate 7 (the point of intersection of lines 43) and the photograph is properly oriented relative to the swing plate 8.

*Operation of topo-angulator*

In the use of the topo-angulator, an oblique photograph (not shown) is placed on the swing plate 8, oriented relative thereto and taped or otherwise suitably secured in place. The swing plate 8 is rotatably adjusted about the stud 7 to provide a correction for the swing of the photograph under study, use being made of the vernier scale on the member 9 for such purpose. The arc 31 is adjusted relative to the arm 21 by means of the tangent screw 35 and with use of the vernier scale member 32 to provide a tilt correction for the photograph. The pivot pin 26 is adjusted by means of the screw 28 and with use of the vernier on the block 29 to provide the proper focal length adjustment for the photograph under study. The index plate 17 is shifted by use of the knob 15 until its index line 18 sights or overlies the photograph image A (Fig. 1). The index line 18 now projects image A into the principal plane equivalent at A' (Fig. 1), making it possible to conveniently read from the arc 31 and the vernier 32 the angle $V_P$ (B'SA') of Fig. 1, that is, the principal plane equivalent angle of the vertical angle V (BSA).

*Distance projector and correction finder*

Figure 7:
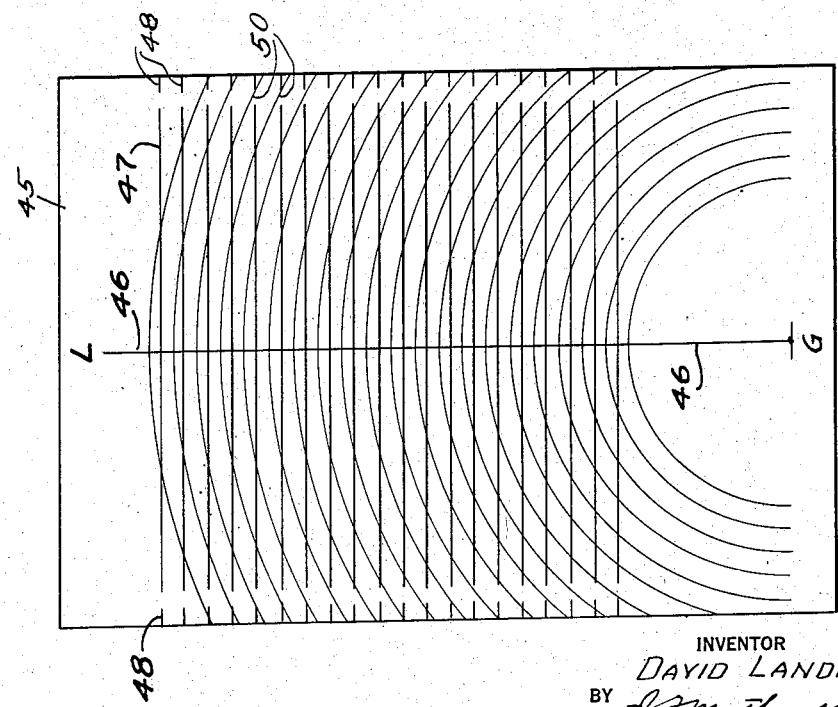
Fig. 7 is a plan view of the distance projector and correction finder of this invention.

The values $M_P$ and $KM^2$ of the above Equation 3 are determined by use of the distance projector and correction finder of Figs. 7 and 8, which comprises a flat sheet 45, which is preferably rectangular, transparent and of a material such as a plastic. Upon the under side of the sheet 45 is etched a center line or principal plane trace 46, corresponding to line GL of Fig. 1, and a series of lines 47, which are perpendicular to the center line 46, equally spaced, and at the desired scale of the map being produced. The center line 46 is parallel to the sheet side edges. Point G at the end of the line 46 in Fig. 7 corresponds to the ground plumb point G of Fig. 1. Graduations 48 are provided at one or both of the side margins or edges of the sheet 45 and opposite the lines 47 to permit convenient readings of projected values of the horizontal ground distance (see M or $G_a$ of Fig. 1).

Also etched upon the underside of the sheet 45 are calibrated arcs 50 of concentric circles radiating from plumb point G (Fig. 7) and representing lines for quickly determining corrections for earth curvature and refraction of light, conditions incident to exposure in taking an aerial photograph. The concentric arcs 50 may be laid off into 10 or 20 foot units according to the relation $KM^2$ where K is constant. The relation is C and $R = .02059 M^2$ where M is the horizontal ground distance in thousand foot units and C and R, the correction for earth curvature and refraction of light, is in feet.

Fig. 8 shows the projector and finder of Fig. 7 applied to a map base 51 and illustrates the manner in which a horizontal ground distance M or Ga (see also Fig. 1), making an angle $\theta$ with the trace GL of the photograph principal plane, is projected into and its value measured as a principal plane component ($M_P$ of Fig. 1) for the principal plane solution:

$$H - h = M_P \tan V_P - KM^2$$

The projector and finder is placed over the map 51 centering its plumb point G upon the plumb point or corresponding station on the map 51. The projector and finder is oriented to make its center line 46 correspond in orientation to the trace of the principal plane upon the map. The principal plane component Ga' of any horizontal distance Ga is scaled Fig. 8 between graduations 52 and 53, interpolating if necessary.

The correction for earth curvature and refraction applicable to horizontal distance Ga in Fig. 8 is obtained between concentric arcs 54 and 55, interpolating if necessary or more conventionally read to the nearest 10 foot unit.

*Mapping from aerial oblique photographs*

The method for making maps from oblique photographs (secured with the use of aerial cameras on aeroplanes in flight) will now be explained with reference to mapping a single new object (a of Fig. 1) from more than one oblique photograph.

Three or more control points of known elevation and position are provided on each oblique photograph. With these control points and the use of established methods of resection, the plumb point position and the orientation of the camera station are determined for each photograph.

Test observations are made on the control points to determine tilt and swing corrections and a consistent value of flying height when independent observations do not yield equal values of flying height. For a further explanation or the procedure for determining tilt and swing corrections, reference is made to the above identified paper appearing in the September 1945 issue of Photogrammetric Engineering.

The next step for a photograph is to determine the direction of a horizontal ray from the plumb point position to the image A of the new object a whose relative position and elevation are desired for mapping purposes. This horizontal direction may be obtained by means of the device set out in Patent 2,364,082 to James G. Lewis, or other suitable mechanical instrument or graphic or analytical means.

Direction alone, however, does not fix the position of the new object. A second photograph overlapping the first, showing an image of the new object, and taken from a different viewpoint is used to fix the position. A horizontal direction is obtained from the second photograph in the same manner as explained with respect to the first photograph.

The horizontal directions secured from the two photographs result in an intersection which fixes the position of the image A of the new object a.

The topo-angulator of Figs. 2 through 6, the projector and finder of Figs. 7 and 8, and Equation 3 above are used in determining the elevation of the unknown object.

The vertical angle $V_P$ of the formula is determined by projecting the true vertical angle V (see Fig. 1) of the photograph image A (see Fig. 1) into the photograph principal plane with the use of the topo-angulator.

The ground distance $M_P$ is secured and read by means of the projector and finder (Figs. 7 and 8). At the same time, the correction $KM^2$ for curvature of the earth and refraction of light is determined for use in the Equation 3.

Having obtained $V_P$, $M_P$ and $KM^2$, Equation 3 is used to obtain the corrected (corrected for C and R) difference of elevation $H - h$. Now the elevation of the new object A (Fig. 1) is obtained by subtracting the difference of elevation from the flying height previously determined.

*Use of topo-angulator with horizontal photographs*

The topo-angulator of Figs. 2 through 6 may also be used with horizontal photographs for measuring horizontal angles. In such use, a horizontal photograph (not shown) is centered and mounted upon the swing plate 8 so that the true horizon is parallel to the guide 12 or to the principal line of the instrument. The arc 31 and the vernier 32 are used—similarly to the horizontal circle of a transit—for measuring horizontal angles of unknown objects being mapped. By providing the lever arm 21 with a ruling edge along its longitudinal axis, the arm 21 may be used in drawing graphic horizontal angles.

Vertical angles from horizontal photographs may also be measured by the topo-angulator. The swing plate 8, on which the photograph rests, is revolved 90 degrees so that the true horizon is perpendicular to the guide 12 or the principal line of the instrument. The arc 31 and the vernier 32 are now used to measure vertical angles in the principal plane in the same way as explained above for measuring vertical angles of oblique photographs. If the true vertical angle is desired, its tangent can be secured by multiplying the tangent of the principal plane vertical angle by the cosine of the horizontal angle.

The foregoing is to be understood as illustrative, as this invention includes all modifications and embodiments coming within the scope of the appended claims.

I claim:

1. An instrument for measuring angles in the making of maps from photographs, said instrument comprising a base, means mounted on said base for rectilinear sliding movement, an arm, means connecting said arm to said slidable means, means connecting said arm to said base, one of said arm connecting means being a pivotal connection, the other of said arm connecting means being a pivotally sliding connection, an arc connected to said arm for movement therewith about one of the pivotal axes of said two connections, a vernier adjacent said arc and having fixed relation relative to said one axis, sighting means connected to said sliding means for movement therewith and extending laterally thereof, and means connected with said base to provide a flat support for a photograph adjacent said sighting means and in a plane below and parallel to the plane of movement of said sighting means, said support having a fixed point under the principal point of a photograph properly oriented thereon, said sighting means having an index line which in one setting of said slidable means overlies said support point and is also aligned with both the axis of said pivotal connection and the axis of said pivotally sliding connection.

2. An instrument as recited in claim 1, wherein means are provided for adjusting the relative spacing of the axes of the two arm connections with the sliding means in set position along its rectilinear sliding path of movement, and said adjusting means provides a focal length adjustment corresponding to the focal length of the photograph being used in the instrument.

3. An instrument as recited in claim 1, wherein means are provided for adjusting the arc about the one axis and relative to the arm, said adjusting means provides a tilt adjustment corresponding to the tilt of the photograph being used in the instrument, and the photograph is adapted to be rotated about its principal point and the support point to correct for swing.

4. An instrument for measuring angles in the making of maps from photographs, said device comprising a base, a photograph support rotatably mounted on said base, sighting means mounted on said base for rectilinear sliding movement relative thereto and extending over said support, an arm, means connecting said arm to said slidable sighting means, means connecting said arm to said base, one of said connecting means providing a pivotal connection, the other of said connecting means providing a pivotally sliding connection, an arc shaped element secured to said arm for pivotal movement therewith, and a vernier scale member secured adjacent said element and in fixed relation relative to the axis of pivotal movement thereof.

5. An instrument as recited in claim 4, wherein means are provided for adjusting the relative spacing of the pivotal axes of the two arm connecting means.

6. An instrument as recited in claim 4, wherein means are provided for adjusting the arc shaped element about the axis thereof and relative to the arm.

7. An instrument for measuring angles of photographs, said device comprising a flat base, a guide secured to said base, a member slidably mounted on said guide for rectilinear movement relative to said base, a stationary pin secured to said base, an arm having one end thereof connected to said pin for pivotally sliding movement relative thereto and having the other end thereof pivotally connected to said slidable member, the rotary movements of said arm about said pin and relative to said slidable member being about parallel axes perpendicular to said base, an arc shaped member secured to said arm for movement therewith about an axis coinciding with the axis of curvature of said arc member and with the axis of said pivotal connection, a vernier scale member secured to said slidable member adjacent said arc member, a photograph support mounted on said base for rotatable adjustment about a fixed axis perpendicular to the said base, and a transparent sighting plate secured to said slidable member and extending laterally therefrom to overlie said photograph support.

8. An instrument as recited in claim 7, wherein the photograph support and the transparent sighting plate extend and are movable in parallel planes relative to each other and to the base; the sighting plate has an index line which in one setting of the slidable member relative to the guide is aligned with the axis of rotary movement of the photograph support and with the two axes of rotary movement of the arm; the pin is rectilinearly adjustable along a line passing through said photograph support axis; and the arc member is adjustable about the arc member axis and relative to said arm.

9. An instrument as recited in claim 7, wherein means are provided for adjusting the pin relative to the axis of rotation of the photograph support.

DAVID LANDEN.

REFERENCES CITED

The following references are of record in the file of this patent:

UNITED STATES PATENTS

| Number | Name | Date |
|---|---|---|
| 378,257 | Leschorn | Feb. 21, 1888 |
| 972,528 | Halloran | Oct. 11, 1910 |
| 1,486,814 | Townsend | Mar. 11, 1924 |
| 1,840,568 | Clark | Jan. 12, 1932 |
| 2,140,914 | Kothny | Dec. 20, 1938 |
| 2,425,097 | Isom | Aug. 5, 1947 |

FOREIGN PATENTS

| Number | Country | Date |
|---|---|---|
| 266,044 | Great Britain | Feb. 16, 1927 |
| 298,442 | Germany | Oct. 14, 1919 |

Certificate of Correction

Patent No. 2,487,814 November 15, 1949

DAVID LANDEN

It is hereby certified that errors appear in the printed specification of the above numbered patent requiring correction as follows:

Column 3, line 15, for the word "within" read *wherein*; line 28, for "A is" read *A' is*; column 5, line 21, for "arm" read *arc*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*